(12) United States Patent
Knittel

(10) Patent No.: US 8,514,472 B2
(45) Date of Patent: Aug. 20, 2013

(54) REFERENCE BEAM COUPLER FOR AN APPARATUS FOR READING FROM AND/OR WRITING TO HOLOGRAPHIC STORAGE MEDIA

(75) Inventor: Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 959 days.

(21) Appl. No.: 12/002,180

(22) Filed: Dec. 14, 2007

(65) Prior Publication Data

US 2008/0252951 A1  Oct. 16, 2008

(30) Foreign Application Priority Data

Dec. 22, 2006  (EP) .................................... 06127030

(51) Int. Cl.
*G03H 1/00*  (2006.01)
(52) U.S. Cl.
USPC .................................. 359/35; 359/11; 359/30
(58) Field of Classification Search
USPC ........................ 359/10, 11, 30, 35, 1
See application file for complete search history.

(56) References Cited

U.S. PATENT DOCUMENTS

| | | | |
|---|---|---|---|
| 3,560,072 A * | 2/1971 | Silverman et al. .............. | 359/11 |
| 4,105,336 A | 8/1978 | Pond | |
| 4,329,059 A | 5/1982 | Pond | |
| 6,661,548 B2 * | 12/2003 | Klug et al. ...................... | 359/23 |
| 6,909,529 B2 * | 6/2005 | Curtis .............................. | 359/30 |
| 7,835,048 B2 * | 11/2010 | Szarvas et al. .................. | 359/10 |
| 2002/0015376 A1 | 2/2002 | Liu | |

FOREIGN PATENT DOCUMENTS

| | | |
|---|---|---|
| JP | 3085578 | 4/1991 |
| JP | 2006243625 | 9/2006 |

OTHER PUBLICATIONS

Search Report Dated Apr. 26, 2007.

* cited by examiner

*Primary Examiner* — Audrey Y Chang
(74) *Attorney, Agent, or Firm* — Robert D. Shedd; Jerome G. Schaefer

(57) ABSTRACT

The present invention relates to a reference beam coupler for an apparatus for reading from and/or writing to holographic storage media, to a multiplexing scheme using the reference beam coupler, and to an apparatus for reading from and/or writing to holographic storage media using such reference beam coupler or multiplexing scheme.

According to the invention, the reference beam coupler has:
  a substrate;
  one or more optical fibers passing through the substrate for coupling one or more reference beams; and
  a reflective area on the substrate for reflecting an object beam, which serves as a Fourier filter for the object beam.

11 Claims, 3 Drawing Sheets

REFERENCE BEAM COUPLER FOR AN APPARATUS FOR READING FROM AND/OR WRITING TO HOLOGRAPHIC STORAGE MEDIA

This application claims the benefit, under 35 U.S.C. §119, of European Patent Application No. 06127030.2 filed Dec. 22, 2006.

FIELD OF THE INVENTION

The present invention relates to a reference beam coupler for an apparatus for reading from and/or writing to holographic storage media, to a multiplexing scheme using the reference beam coupler, and to an apparatus for reading from and/or writing to holographic storage media using such reference beam coupler or multiplexing scheme.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a single or few 2-dimensional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

In collinear holographic data storage the object beam and one or more reference beams run along a common optical axis. For this purpose an optical system for combining the object beam and the one or more reference beams on the common optical axis is needed. In the following this optical system will be called a "reference-beam coupler".

For example, WO 2006/003077 discloses a collinear optical head for a reflection-type holographic recording medium, which is capable of obtaining an increased capacity. The optical head includes a special reference beam coupler, which consists of a 6$f$ lens system, a special twin diffractive beam generator and a specially shaped Fourier filter. The reference beam coupler will be described in more detail later on with reference to FIGS. 1 and 2.

SUMMARY OF THE INVENTION

It is an object of the invention to propose a simplified and less alignment sensitive reference beam coupler.

According to the invention, this object is achieved by a reference beam coupler for an apparatus for reading from and/or writing to holographic storage media, having:
   a substrate;
   one or more optical fibers passing through the substrate for coupling one or more reference beams; and
   a reflective area on the substrate for reflecting an object beam.

The reference beam coupler according to the invention makes use of a fiber optics system and integrates reference beam generation in a single element. This has the advantage that the reference beam coupler is very compact and robust. In addition, no separate alignment of the reference beams is necessary. It is sufficient to couple the laser radiation into a single mode fiber. This is not yet done very often in the blue wavelength range. However, this procedure is a well established technology in the telecommunication business. In addition, fiber technology and fiber lasers are becoming more and more popular. The reflective area is, for example, produced by coating the substrate or by placing a reflective element such as a mirror on the substrate.

Advantageously, the one or more optical fibers are arranged adjacent to the reflective area. This has the advantage that essentially circular reference beams are generated, which are arranged collinear with the object beam.

Alternatively, the reflective area partly covers the one or more optical fibers. This arrangement allows to generate half-cone shaped reference beams, which are useful for avoiding the generation of conjugate holograms in the holographic storage medium due to the reflection of the reference beams.

Preferably, the reflective area serves as a Fourier filter for the object beam. This has the advantage that a separate Fourier filter for the object beam does not need to be provided. Reference beam generation and Fourier filtering of the object beam are integrated in a single optical element.

Advantageously, the reference beam coupler is arranged such that it is rotatable around an axis perpendicular to the reflective area. This allows to realize angular multiplexing very efficiently. For multiplexing it is sufficient to rotate the reference beam coupler by the desired multiplexing angle.

To avoid a twisting of the optical fibers stoppers are provided, which limit the rotation of the reference beam coupler to a suitable angle range.

Alternatively, the reference beam coupler includes a ring of optical fibers to which laser radiation can be selectively coupled. Also in this way angular multiplexing can be realized. This solution has the advantage that no moveable mechanical parts are needed. Angular multiplexing is performed by coupling the laser radiation to the desired fibers of the fiber bundle.

Preferably, the one or more optical fibers are polarization-maintaining single-mode fibers. The use of single-mode fibers ensures that a suitable beam quality is maintained. The maintenance of the polarization enables the use of polarizing beam splitting elements in the further optical path, which reduces the overall optical losses of the optical system.

A multiplexing method for collinear holographic data storage, which makes use of the reference beam coupler according to the invention, has the steps of:
   coupling one or more reference beams into the optical path of an apparatus for reading from and/or writing to a holographic storage medium with a reference beam coupler;
   reading or writing a first hologram;
   shifting the one or more reference beams by a multiplexing angle; and
   reading or writing a second hologram.

Shifting of the one or more reference beams is done by rotating the reference beam coupler and/or by switching between different reference beams. using a ring of optical fibers. In both cases the positions of the one or more reference beams on the holographic storage medium are shifted. This rotational shift can be used for angular multiplexing upon the reading or writing of subsequent holograms. This enables to increase the data rate for recording, as the stepwise movement of the holographic storage medium, which is necessary for shift multiplexing, limits the data rate.

Advantageously, the multiplexing method further has the step of shifting the holographic storage medium by a shifting distance in addition to rotating the reference beam coupler by the multiplexing angle. This allows to additionally realize a multiplexing procedure combining shift multiplexing and angular multiplexing. Instead of rotating the holographic storage medium in large steps for shift multiplexing, the holographic storage medium is rotated in small steps corresponding to a shifting distance. At the same time the reference beam coupler is rotated by a multiplexing angle. Also in this case the data rate for recording is increased, as the holographic storage medium only needs to be rotated by small steps.

Preferably, an apparatus for reading from and/or writing to a holographic storage medium includes a reference beam coupler according to the invention or is adapted to perform a multiplexing method according to the invention. Such an apparatus has a more robust and less complex optical system. At the same time the data capacity is increased by the new multiplexing method.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
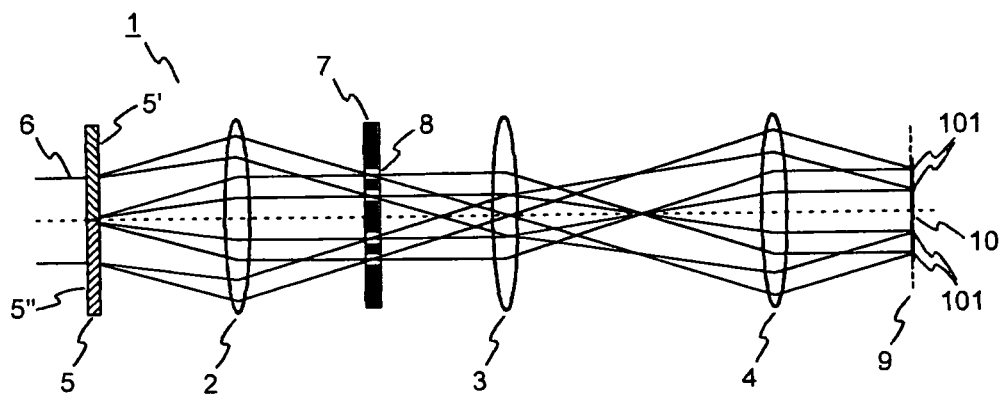
FIG. 1 shows a prior art reference beam generator.

FIG. 1 shows a reference beam coupler 1 for a one-dimensional array of high-NA half-cone reference beams 101 according to the prior art. The reference beam coupler 1 includes a 6f lens system, which contains three telecentric relay lenses 2, 3, 4. Two parts 5', 5" of a special twin diffractive beam generator 5 form half-circle-shaped beams from a light beam 6. The upper part 5' of the special diffractive beam generator 5 diffracts only the positive diffraction orders of the light beam 6, while it suppresses the zeroth order and negative orders. The lower part 5" diffracts only the negative orders of the light beam 6, and suppresses the zeroth order and positive orders. The first relay lens 2 forms half-cone-shaped focused beams from the diffracted half-circle-shaped beams. Located in the focal plane of the first relay lens 2 is a phase spatial light modulator 7 (phase-SLM). The pixels 8 of the phase-SLM 7 retard the phase of the half-cone-shaped focused beams with zero or π radians. This is known as phase-coding. The further relay lenses 3, 4 form a sharp image of the phase-SLM 7 in the first Fourier plane 9. Located in this Fourier plane 9 is a Fourier filter 10, which will be described in more detail below with reference to FIG. 2. With this reference beam coupler 1 an array of reference beams 101 with appropriate phase codes is realized. The distance between the focus spots of the half-cone beams in the first Fourier plane can be adjusted with an appropriate selection of the focal lengths of the second and third lenses 3, 4.

Figure 2:
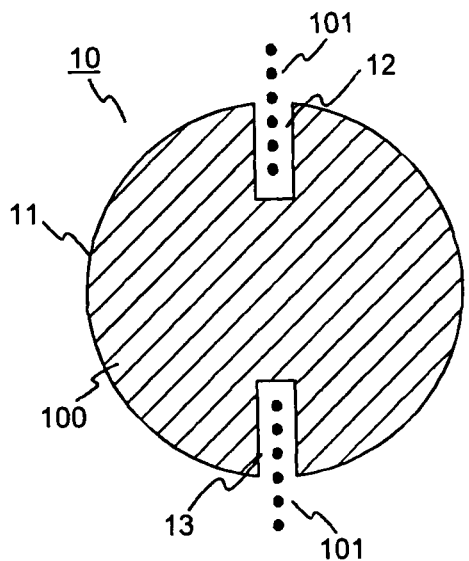
FIG. 2 schematically depicts a Fourier filter of the prior art reference beam generator.

FIG. 2 shows the Fourier filter 10 in the first Fourier plane 9. Here the reference beams 101 are coupled with an object beam 100 by a recording Fourier mirror 11. This mirror 11 has a special shape. On opposite sides of the mirror aperture there are two non-reflecting, transparent rectangular areas 12, 13 for coupling-in the reference beams 101. The circular shape of the recording Fourier mirror 11 low-pass filters the object beam 100 by cutting off specific Fourier components. The reference beams 101 pass through the non-reflective areas 12, 13, whereas the object beam 100 is reflected by the recording Fourier mirror 11. With an appropriate selection of the size of the Fourier mirror 11, the size of the rectangular areas 12, 13, and the length of the line formed by the spots of the reference beams 101, the total system storage capacity can be optimized. The arrangements of the beams 100, 101 in the second and third Fourier planes are similar to that shown in FIG. 2 for the first Fourier plane 9.

Figure 3:
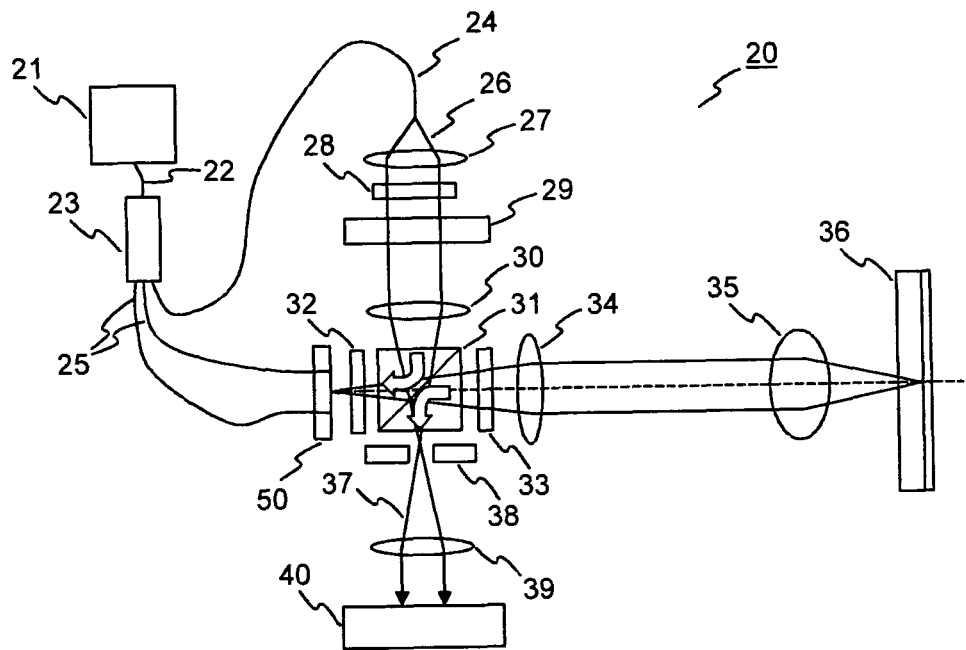
FIG. 3 shows the object beam path in an apparatus for reading from and/or writing to holographic storage media.

In FIG. 3 the object beam path in an apparatus according to the invention for reading from and/or writing to holographic storage media is shown schematically. For simplicity the servo system is omitted. The light emitted by a laser 21 is transmitted by an optical fiber 22 to a fiber splitter module 23, which distributes the laser radiation to an optical fiber 24 for the object beam 26 and a pair of optical fibers 25 for two reference beams. Of course, the invention is not limited to two reference beams. It is likewise possible to use three or more reference beams. In addition, the object beam 26 can likewise be coupled into the optical path without using an optical fiber 24. During writing the linear polarized object beam 26 is collimated by a first lens 27, passed through a first quarter wave plate 28 and a spatial light modulator 29, and focused by a second lens 30 through a polarizing beam splitter 31 and a second quarter wave plate 32 onto a reference beam coupler 50 according to the invention. The reference beam coupler 50 will be discussed in more detail below with reference to FIGS. 5 and 6. The object beam 26 is reflected by the reference beam coupler 50 and passes again through the second quarter wave plate 32. Consequently, it is transmitted by the polarizing beam splitter 31. Subsequently the object beam passes a third quarter wave plate 33 and is collimated by a third lens 34, before it is focused into a hologram layer of a reflection type holographic storage medium 36 by a fourth lens 35.

During reading the reconstructed object beam 37 is reflected by a reflective layer of the holographic storage medium 36. It is then collimated by the fourth lens 35 and imaged onto an array detector 40 by the third lens 34 via the third quarter wave plate 33, a pin-hole 38 and a fifth lens 39. The pin-hole 38 Fourier filters the reconstructed object beam 37.

Figure 4:
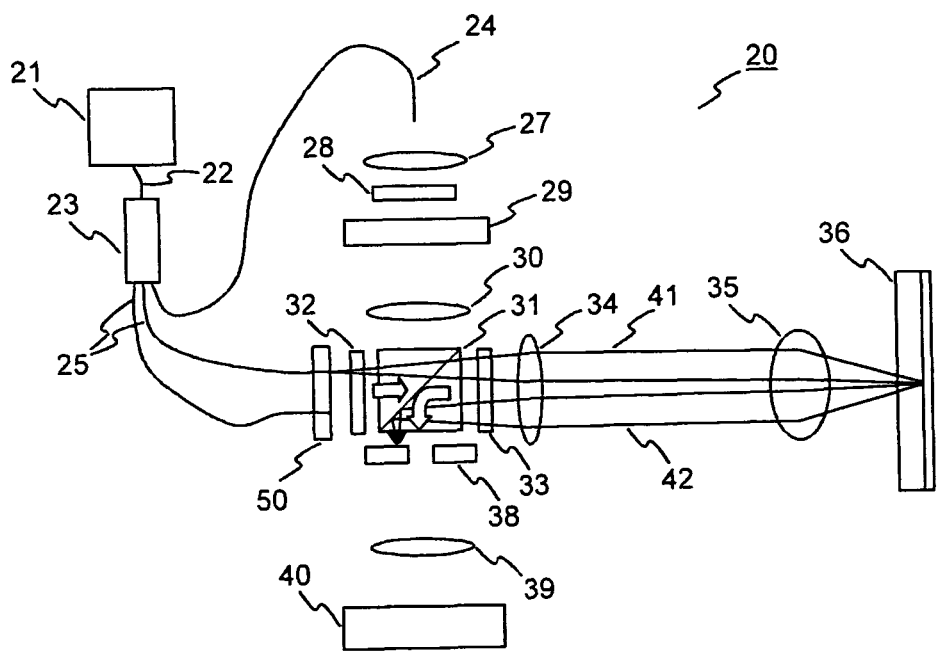
FIG. 4 shows the reference beam path in the apparatus of FIG. 3.

FIG. 4 depicts the same apparatus as FIG. 3, but this time the reference beam path is illustrated. For better clarity only one reference beam 41 is depicted. The reference beam 41 is coupled into the optical path by the reference beam coupler 50. After passing the second quarter wave plate 32, the polarizing beam splitter 31 and the third quarter wave plate 33, the reference beam 40 is focused into the hologram layer of the holographic storage medium 36 by the third lens 34 and the fourth lens 35.

The reflected reference beam 42 passes the fourth lens 35, the third lens 34 and the third quarter wave plate 33. It is then directed towards the pin-hole 38 by the polarizing beam splitter 31. As the reference beam 41 is not arranged on the optical axis of the optical path, the reflected reference beam 42 is blocked by the pin-hole 38 and does not reach the array detector 40.

Figure 5:
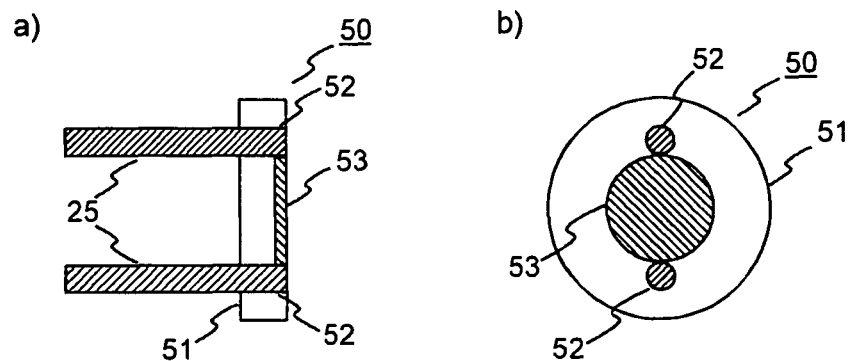
FIG. 5 depicts a first embodiment of a reference beam coupler according to the invention.

In FIG. 5 a first embodiment of a reference beam coupler 50 according to the invention is illustrated schematically. The reference beam coupler 50 consists of a glass substrate 51 with two or more holes 52. Optical fibers 25, preferentially polarization-maintaining single-mode fibers, are mounted into these holes 52. Furthermore a reflective coating 53 is arranged on the glass substrate 51. The coating 53 is used to reflect and Fourier filter the object beam 26, whereas the optical fibers 25 are used to generate the reference beams 41. Consequently, the reference beam coupler 50 is suitable for replacing the prior art optical system shown in FIGS. 1 and 2.

Figure 6:
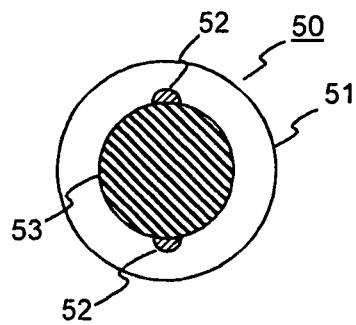
FIG. 6 depicts a second embodiment of a reference beam coupler according to the invention.

A second embodiment of a reference beam coupler 50 according to the invention is shown in FIG. 6. This reference beam coupler 50 allows to generate halve-cone shaped reference beams 40. By increasing the diameter of the reflective coating 53 part of the fiber exits are blocked and halve-cone shaped reference beams 40 remain.

The reference beam coupler 50 according to the invention is very useful for angular multiplexing. By rotating the reference beam coupler 50 the positions of the reference beams 41 on the holographic storage medium 36 are shifted. This rotation can be used for angular multiplexing. The mass of the reference beam coupler 50 is smaller than the mass of the holographic storage medium 36. This allows to additionally realize a multiplexing procedure combining shift multiplexing, i.e. movement of the holographic storage medium 36, and rotation of the reference beam coupler 50. Instead of rotating the holographic storage medium 36 in large steps for shift multiplexing, the holographic storage medium 36 is rotated in small steps corresponding to a shifting distance. Simultaneously the reference beam coupler 50 is rotated by a multiplexing angle. This enables to increase the data rate for recording, as the stepwise movement of the holographic storage medium 36 limits the data rate.

Figure 7:
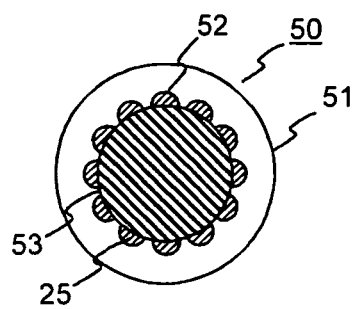
FIG. 7 illustrates a third embodiment of a reference beam coupler according to the invention

Instead of using only two fibers 25 for the reference beam coupler 50 it is likewise possible to use a bunch of fibers that are arranged in a ring shaped fashion. This is schematically depicted in FIG. 7, which shows a top view of a reference beam coupler 50 with a ring of fibers 25. By connecting these fibers to a fiber switch, which directs the laser radiation to a selected fiber, it is possible to do the multiplexing without mechanical rotation of the reference beam coupler 50.

What is claimed is:

1. A reference beam coupler for an apparatus for reading from or writing to holographic storage media, having:
   a transparent substrate;
   one or more optical fibers passing through the transparent substrate for coupling one or more reference beams; and
   a reflective area on the transparent substrate for reflecting an object beam, wherein a diameter of the reflective area is selected such that the reflective area is adapted to Fourier filter the object beam.

2. The reference beam coupler according to claim 1, wherein the one or more optical fibers are arranged adjacent to the reflective area.

3. The reference beam coupler according to claim 1, wherein the reflective area covers a part of the exit surface of each of the one or more optical fibers.

4. The reference beam coupler according to claim 1, wherein the reference beam coupler is rotatable around an axis perpendicular to the reflective area.

5. The reference beam coupler according to claim 1, wherein the reference beam coupler includes a ring of optical fibers to which laser radiation can be selectively coupled.

6. The reference beam coupler according to claim 1, wherein the one or more optical fibers are polarization-maintaining single-mode fibers.

7. A multiplexing method for collinear holographic data storage, having the steps of:
   coupling one or more reference beams into the optical path of an apparatus for reading from or writing to a holographic storage medium with a reference beam coupler according to claim 1;
   reading or writing a first hologram;
   shifting the one or more reference beams by a multiplexing angle; and
   reading or writing a second hologram.

8. The method according to claim 7, wherein shifting the one or more reference beams by a multiplexing angle is performed by rotating the reference beam coupler by the multiplexing angle or by selectively coupling laser radiation to one or more optical fibers of a ring of optical fibers.

9. The method according to claim 7, further having the step of shifting the holographic storage medium by a shifting distance in addition to shifting the one or more reference beams by the multiplexing angle.

10. An apparatus for reading from or writing to a holographic storage medium, wherein the apparatus is adapted to perform a multiplexing method according to claim 7.

11. An apparatus for reading from or writing to a holographic storage medium, wherein the apparatus includes a reference beam coupler according to claim 1.

* * * * *